(12) United States Patent
Hejda et al.

(10) Patent No.: US 12,682,462 B2
(45) Date of Patent: Jul. 14, 2026

(54) INDIVIDUAL WARPING OF IMAGE CONTENTS IN AN IMAGING UNIT OF A HUD FOR IDEAL PRESENTATION OF DEPTH INFORMATION

(71) Applicant: Bayerische Motoren Werke Aktiengesellschaft, Munich (DE)

(72) Inventors: Tomas Hejda, Neufahrn (DE); Sebastian Takeshi Lampen, Tokyo (JP)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 156 days.

(21) Appl. No.: 18/694,012

(22) PCT Filed: Jul. 29, 2022

(86) PCT No.: PCT/EP2022/071436
§ 371 (c)(1),
(2) Date: Mar. 21, 2024

(87) PCT Pub. No.: WO2023/066540
PCT Pub. Date: Apr. 27, 2023

(65) Prior Publication Data
US 2024/0391318 A1      Nov. 28, 2024

(30) Foreign Application Priority Data
Oct. 22, 2021      (DE) ..................... 10 2021 127 553.9

(51) Int. Cl.
*B60K 35/23*        (2024.01)
*B60K 35/60*        (2024.01)
(Continued)

(52) U.S. Cl.
CPC ................ *G06T 7/11* (2017.01); *B60K 35/23* (2024.01); *B60K 35/60* (2024.01);
(Continued)

(58) Field of Classification Search
None
See application file for complete search history.

(56) References Cited

U.S. PATENT DOCUMENTS

| | | | | |
|---|---|---|---|---|
| 2008/0088526 A1* | 4/2008 | Kadantseva | ........... | G02B 27/01 |
| | | | | 345/1.1 |
| 2017/0169612 A1* | 6/2017 | Cashen | .................. | G06T 19/20 |

(Continued)

FOREIGN PATENT DOCUMENTS

| | | |
|---|---|---|
| DE | 10 2015 109 027 A1 | 12/2016 |
| DE | 11 2019 003 420 T5 | 3/2021 |

OTHER PUBLICATIONS

International Search Report (PCT/ISA/210) issued in PCT Application No. PCT/EP2022/071436 dated Dec. 5, 2022 with English translation (5 pages).

(Continued)

*Primary Examiner* — James M Mcpherson
(74) *Attorney, Agent, or Firm* — Crowell & Moring LLP

(57)      ABSTRACT

An operating method for a vehicle head-up display device has an imaging unit, which is designed to generate a light beam with display content, and a partially transparent reflecting plate which is disposed in a user's field of view, reflects the light beam to their eye box and thereby presents the display content to them in a virtual image plane behind the reflecting plate. The particular display content is divided into a plurality of presentation sub-areas, each of which is pre-distorted, as it is generated in the imaging unit, using an associated individual digital warping matrix which is pre-determined or dynamically determined independently of the other presentation sub-areas, so that the individual sub-areas can be presented in the virtual image plane with different perspective characteristics.

11 Claims, 1 Drawing Sheet

(51) Int. Cl.

| | |
|---|---|
| *G02B 27/00* | (2006.01) |
| *G02B 27/01* | (2006.01) |
| *G06T 3/18* | (2024.01) |
| *G06T 7/11* | (2017.01) |

(52) U.S. Cl.
CPC ..... *G02B 27/0025* (2013.01); *G02B 27/0101* (2013.01); *G06T 3/18* (2024.01); *B60K 2360/31* (2024.01)

(56) References Cited

U.S. PATENT DOCUMENTS

| | | | |
|---|---|---|---|
| 2017/0299873 A1 | 10/2017 | Hickerson et al. | |
| 2019/0031027 A1* | 1/2019 | Pala | B60K 35/53 |
| 2021/0260999 A1 | 8/2021 | Masuya et al. | |

OTHER PUBLICATIONS

German-language Written Opinion (PCT/ISA/237) issued in PCT Application No. PCT/EP2022/071436 dated Dec. 5, 2022 with English translation (9 pages).

German-language Search Report issued in German Application No. 10 2021 127 553.9 dated May 18, 2022 with partial English translation (11 pages).

* cited by examiner

INDIVIDUAL WARPING OF IMAGE CONTENTS IN AN IMAGING UNIT OF A HUD FOR IDEAL PRESENTATION OF DEPTH INFORMATION

BACKGROUND AND SUMMARY

The invention relates to field-of-view display apparatuses for a motor vehicle or another land vehicle, aircraft or watercraft, which are also known as head-up displays (HUDs). Such apparatuses are designed to generate a virtual image that is superposed directly into the field of view of a user by way of reflection at a partially transparent reflection panel, such as a windshield, rear window or side window of the vehicle, or at a combiner panel which is provided specifically for this purpose and is arranged in the field of view of the user. The invention is directed in particular toward a method for operating such a field-of-view display apparatus, and to a vehicle equipped therewith.

A head-up display is used in a vehicle for example to superpose speed information and other useful navigation and vehicle operating instructions or even entertainment contents in the form of a virtual image over the real environment image in front of the vehicle that is viewed by the driver or another occupant. For this purpose, a HUD of conventional construction comprises a projection unit which is accommodated below a top side of the instrument panel. The projection unit firstly comprises an image-generating unit, for example a display, for generating a light beam with the desired display content. The projection unit generally furthermore comprises a projection optical unit, for example one or more mirrors, to direct the light beam in a suitable form and direction onto a partially transparent reflection panel, and via reflection at the latter, the display contents of the display are superposed into the field of view of the user. The choice of optical properties and the mutual arrangement of individual components of the projection unit and of the reflection panel determines at what distance, size and quality the virtual image is presented behind the reflection panel, and from what spatial region intended for the user's eyes (eyebox) in the vehicle it can be seen.

Head-up displays currently available for motor vehicles generally have a nearly vertical virtual image plane. For future HUD technologies for road vehicles, however, there is another known approach, in which, owing to a suitable tilt of the image-generating unit, the virtual image plane can no longer lie vertically, but in particular nearly parallel to the road, as is disclosed for example in DE 11 2019 003 420 T5. It can be used to create a clear depth or 3D effect for the viewer.

It is furthermore known to pre-distort the display content during its generation in the image-generating unit with a suitable digital warping matrix for the purposes of image correction or in order to generate a perspective impression (cf. FIG. 2).

It is an object of the present invention to provide an operating method which constitutes an alternative method and/or is improved regarding the presentation possibilities, the depth impression, the image quality and/or different aspects, for a field-of-view display apparatus which is suitable in particular for use in a vehicle.

This object is achieved by a method for operating a field-of-view display apparatus and by a corresponding control unit, field-of-view display apparatus, and a vehicle equipped therewith, according to the independent claims. The dependent claims relate to further configurations. All refining features and effects stated in the claims and in the following description for the method also apply in relation to the control unit, the field-of-view display apparatus, and the vehicle, and vice versa.

According to a first aspect, an operating method for a field-of-view display apparatus which can be used in particular in a vehicle is provided. The field-of-view display apparatus can be designed for example as a head-up display (HUD). The vehicle may be a motor vehicle or any other land vehicle, aircraft or watercraft.

The field-of-view display apparatus comprises an image-generating unit (PGU) designed to generate a light beam with a desired display content. This may be any suitable image-generating apparatus, for example a display such as a liquid crystal display (LCD), LCOS (liquid crystal on silicon) or a self-luminous display based on μLEDs or OLEDS, or a DMD apparatus (digital micromirror device) and many more.

A suitable projection optical unit, which may comprise for example one or more mirrors, such as a folding mirror and/or a concave mirror, may be provided in the beam path of the light beam generated by the image-generating unit. The specific configuration and arrangement of the projection optical unit should in every specific application be designed and optimized such that the light beam is directed thereby in a predetermined form and direction onto a partially transparent reflection panel arranged in the field of view of a user, to be reflected by the reflection panel to the user's eyebox and to thereby present the display content for the user in the form of a virtual image in a virtual image plane behind the reflection panel. The reflection panel may be formed, for example, by a portion of a windshield of the vehicle or by a combiner panel specifically arranged in front of it. In other words, it is not necessarily part of the field-of-view display apparatus that is specified further below and which can also be produced and sold without it, for example if the vehicle windshield is used as the reflection panel. As is customary, the eyebox of the field-of-view display apparatus is understood to mean a two-dimensional or three-dimensional spatial region from which the virtual image is visible without obstruction.

Before or during its generation in the image-generating unit, the display content to be presented at a respective time is divided into a plurality of presentation subregions (known as region splitting), which are presented side-by-side in the virtual image plane. The entire display content that can be presented in the virtual image plane is thus composed of these individual subregions.

Before or during its generation in the image-generating unit, each of these presentation subregions is (pre-) distorted with an associated individual warping matrix, which is predetermined or determined dynamically independently of the respective other subregions of the display content. As a result, the individual presentation subregions of the display content can be presented in the virtual image plane with differing perspective properties.

In a deviation from the prior art, where the entire display content is distorted with a single warping matrix (cf. FIG. 2), an idea associated with the present method is thus to split the display content into two-dimensional subregions in order to apply independent different warping matrices to different subregions (as is illustrated for example in FIG. 3). It is possible here in particular for head-up displays having a virtual image plane which has been tilted out of the vertical pose to present both two-dimensional information (such as simple text, for example) and also tilted depth information (such as markings shown in contact-analog fashion, for example) with 3D effect. These and other contents can be differentiated via perspective distortion of the image, which is selected individually depending on the nature and presentability of the respective content. To make this possible, and also to provide the greatest possible presentation flexibility of the display contents with the simplest possible equipment means, a solution is proposed herein for the application of individual digital warpings (i.e., individually defined warping matrices) for different contents/subregions of the display content. In particular, a simultaneous combination of seemingly three-dimensional displays (for example dynamic displays, i.e., changing their poses in the virtual image plane) and two-dimensional displays (for example static, i.e., fixed in the virtual image plane) is thus possible. The invention is applicable to any type and pose of the virtual image plane, in particular to field-of-view display apparatuses with a vertical or even horizontal or, between the two, tilted virtual image plane.

In particular, at least one of these presentation subregions can be defined by it containing objects that are to be presented in the virtual image plane with a depth effect (in other words, seemingly three-dimensional) and/or contact-analog effect (i.e., oriented with respect to real vicinity objects located behind the reflection panel). For this purpose, the associated warping matrices are configured such that they perspectively pre-distort the presentation subregions to bring about the respective desired individual depth and/or contact-analog effect, which may also differ greatly from one subregion to another. These warping matrices may be defined in addition to a predetermined image correction in order to correct for any aberrations in the further optical beam path in a manner known per se.

Furthermore, at least one presentation subregion can be defined by it containing objects that are intended to be presented without depth effect in the virtual image plane. Such objects or subregions can be, for example, text fields with system-related or vehicle-related information or other information without relation to real vicinity objects. However, they can also be static symbols, such as predetermined warning symbols. Here, the associated warping matrices are configured to distort these presentation subregions not at all or merely for a predetermined image correction without any depth effect and/or contact-analog effect.

The division of the display content into the individual presentation subregions and/or the determination of the associated individual warping matrices can be dynamic, that is to say varying over time, depending on the respective display content to be presented. For example, a movie or a desktop image of the user's PC can be presented over the entire available surface of the virtual plane with a uniform warping matrix to the driver in a relaxed position of the driver's seat in an autonomous driving regime, while different types of important information regarding vehicle guidance are presented to the driver while actively controlling the vehicle in different regions of the virtual image plane which are dynamically set depending on the situation, with respective optimum different distortion (warping).

Alternatively, in a simpler case, the subdivision of the display content into the individual presentation subregions and/or the determination of the associated individual warping matrices can, however, also be static by being predefined in advance. For example, always the same type of information can be presented to a driver of the vehicle in always the same regions of the virtual image plane and always with the same perspective presentation properties, for example the current speed limit and the current actual vehicle speed can be presented at the top of the image, while the lower image region presents contact-analog arrow markings or the current distance from the other vehicle driving ahead as a navigational aid along the road in perspectively distorted fashion, or vice versa.

According to a further aspect, a control unit is provided, which is designed and configured to automatically carry out the method of the type presented here. For this purpose, for example a corresponding computer program can be installed in the control unit and run during the operation of the field-of-view display apparatus.

According to a further aspect, a field-of-view display apparatus for use in a vehicle is provided. The field-of-view display apparatus comprises firstly a image-generating unit configured to generate a light beam with a desired display content, and secondly the abovementioned control unit. Furthermore, it can comprise an at least partially transparent reflection panel, which is arranged in the beam path of the light beam and is arranged and designed in the field of view of a user in such a way that it reflects the light beam to an eyebox intended for the user, as a result of which the display content is presentable to the user in a virtual image plane behind the reflection panel. Furthermore, at least one mirror and/or further optical elements can be arranged in the beam path of the light beam generated by the image-generating unit and be configured to direct the light beam in a predetermined form and direction onto the reflection panel so that it is reflected thereby to the eyebox of the user and, as a result, the display content is presented to the user in the virtual image plane behind the reflection panel. The image-generating unit, the mirrors and possibly further projection optical units can be combined, for example, in a spatially compact projection unit. In particular, the field-of-view display apparatus can be configured to present the display content in a virtual image plane that is horizontally inclined (i.e. for example at an inclination angle of no more than) 45° or substantially horizontal with respect to a vehicle-side Cartesian coordinate system when installed in a vehicle.

According to a further aspect, a vehicle, in particular a motor vehicle or any other land vehicle, aircraft or watercraft, is provided. The spatial orientation terms used here, such as "above", "below", "in front of", "lateral", "horizontal", "vertical", etc. relate here to the typical vehicle-fixed Cartesian coordinate system with mutually perpendicular longitudinal, lateral and height axes of the vehicle.

The vehicle comprises a windshield and, arranged below it, an instrument panel and is equipped with a field-of-view display apparatus of the type presented herein. The image-generating unit thereof or the entire projection unit thereof (which comprises the image-generating unit including any further aforementioned projection optical unit) can be arranged in particular inside the instrument panel or in/on the top side thereof, for example mounted directly below the top side of the instrument panel, in a manner such that the light beam is directed from the projection unit onto the windshield or a combiner panel positioned in front of it in the vehicle within the field of view of the driver or of another occupant, with the combiner panel serving as a partially transparent reflection panel. Alternatively, however, the field-of-view display apparatus can also be mounted at any other suitable location in the vehicle.

The aforementioned aspects of the invention and their specific configuration variants will be explained in more detail below additionally using examples illustrated in the attached drawings. The drawings should be understood to be purely schematic illustrations, i.e., not to scale.

DETAILED DESCRIPTION OF THE DRAWINGS

Figure 1:
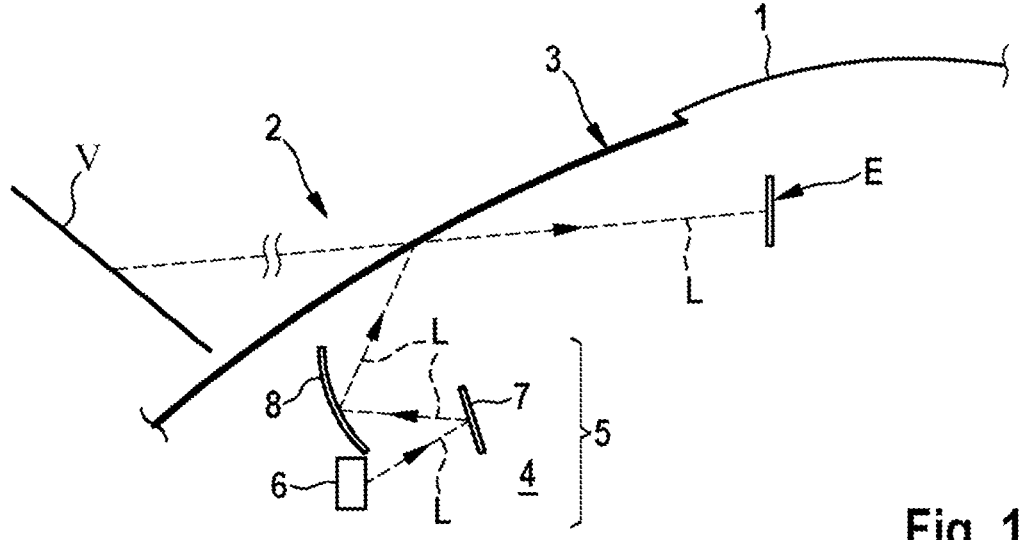
FIG. 1 shows an exemplary embodiment of a field-of-view display apparatus of the type presented herein in a motor vehicle in a vertical longitudinal section.

FIG. 1 shows, in a highly simplified schematic vertical longitudinal sectional illustration, an exemplary embodiment of a vehicle 1 comprising a field-of-view display apparatus 2 of the type presented herein. In this example, it is a motor vehicle, which is indicated merely by way of its windshield 3. Below it, in an instrument panel 4 (not illustrated in more detail), a projection unit 5 of the field-of-view display apparatus 2 is arranged. This is, purely by way of example, a head-up display (HUD). The windshield 3 in this example serves as a partially transparent reflection panel of the field-of-view display apparatus 2 so that a virtual image is presented to a user (the driver or another occupant, indicated only by way of the relevant eyebox E) in their direct field of view in a virtual image plane V, which lies outside the vehicle at a predetermined distance in front of the windshield 3. In this example, the virtual image plane V is inclined relative to the horizontal plane by a predetermined tilt angle (indicated only schematically in FIG. 1).

The projection unit 5 contains an image-generating unit 6 (also referred to as a PGU), for example a display, for example a TFT-LCD, which is configured to generate a light beam L with a desired display content. The light beam L coming from the image-generating unit 6 is indicated in simplified fashion by way of its central ray, which extends out of a center of the display into a center of the eyebox E. The eyebox E is located in the vehicle 1 at a predetermined position with respect to the windshield 3 and is a spatial region that is intended for the user's eyes and from which the virtual image can be seen without obstruction.

Purely by way of example, a folding mirror 7 and a concave mirror 8 are arranged in the beam path of the light beam L inside the projection unit 5 in FIG. 1. The folding mirror 7 and the concave mirror 8 are designed such that the light beam L leaves the projection unit 5 in a suitable form and with a suitable direction in order to then be reflected by the windshield 3 to the eyebox E.

Figure 2:
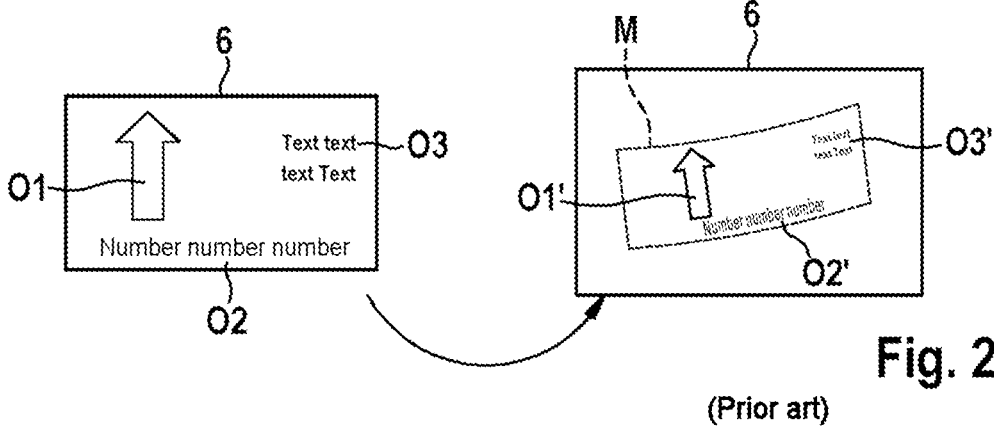
FIG. 2 shows a method step according to the prior art during operation of a conventional field-of-view display apparatus, in which the entire display content to be presented is pre-distorted during its generation with a single warping matrix.

FIG. 2 shows a method step known from the prior art during operation of a conventional field-of-view display apparatus. In this method step, the entire display content to be presented (as is shown for example in FIG. 2 on the left), while or before it is generated in the image-generating unit 6, is pre-distorted with a single uniform warping matrix M, as is indicated by a curved arrow. The result of this distortion can be seen in FIG. 2 on the right and is generated in the image-generating unit 6 in this way, and can therefore also be seen in the virtual image plane by the user. All different objects/contents O1, O2 and O3 of the display content are provided here in the same way with a perspective distortion by the common warping matrix M. However, such a distortion is not suitable or desired for all objects/contents. For example, the direction arrow (object O1) to be presented in contact-analog fashion or perspectively is imaged by the warping matrix M onto an object O1' which is nearly ideally perspectively distorted for this purpose. However, due to this distortion, the number field (object O2), which has a content-based relation to different vicinity objects than the direction arrow, is not transformed appropriately for this content into a distorted object O2', which should have been distorted in a different direction than the direction arrow (for example in FIG. 3). And a third object O3, which is a text field with information without any relation to real vicinity objects, should in the ideal case not be distorted at all (such as for example in FIG. 3), which is not possible in FIG. 2, however. It is transformed by the matrix M, similar to the direction arrow, into a perspectively distorted object O3', as a result of which the text does not only become skewed, but it is also presented smaller and thus becomes more difficult to read overall.

Figure 3:
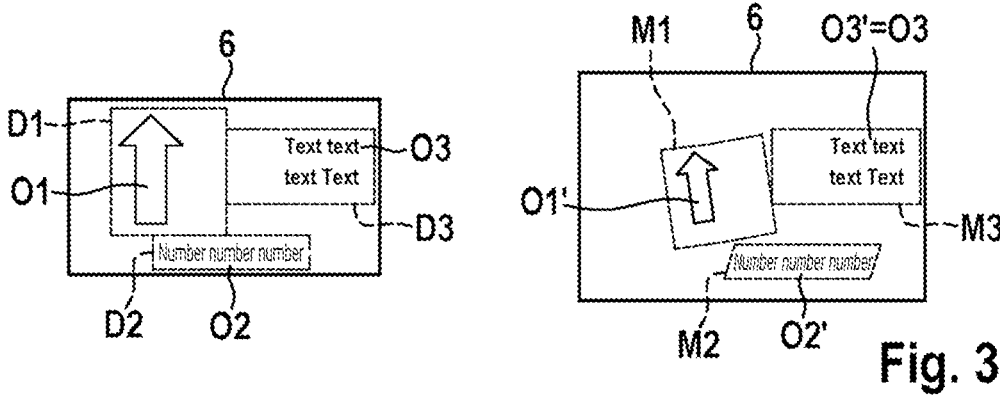
FIG. 3 shows an example of a method step of the type presented herein during operation of the field-of-view display apparatus of FIG. 1, in which the display content to be presented is split into a plurality of (in the present case three) different two-dimensional subregions with objects of different types, which two-dimensional subregions are then distorted by respective individual, differing warping matrices.

To solve these problems, FIG. 3 shows an example of a corresponding step of a method of the type presented herein, which is used during operation of the field-of-view display apparatus 2 of FIG. 1. In contrast to FIG. 2, the display content to be presented is split in this case into a plurality of (merely by way of example three) different two-dimensional presentation subregions D1, D2 and D3 with the aforementioned objects O1, O2 and O3 of different types, as is shown in FIG. 3 on the left. Subsequently, these subregions D1, D2 and D3 (and thus the objects O1, O2 and O3 contained therein) are distorted with respective associated individually defined warping matrices M1, M2 and M3, which are optimized independently of one another for the respective content of these subregions D1, D2 and D3 and have correspondingly highly different effects. For example, the text field in FIG. 3 is transformed into itself as desired without distortion by the local matrix M3 (O3'=O3), and the number field is perspectively distorted by the local matrix M2 in a different way than the direction arrow by its local matrix M1, with the result that ideally perspectively distorted objects O2' and O1' are presented independently of one another for their respective content.

LIST OF REFERENCE SIGNS

1 Vehicle
2 Field-of-view display apparatus
3 Windshield
4 Instrument panel
5 Projection unit
6 Image-generating unit
7 Folding mirror
8 Concave mirror
M, M1-M3 Warping matrices
D1-D3 Presentation subregions
O1-O3 Objects before warping
O1'-O3' Objects after warping
L Light beam
V Virtual image plane
E Eyebox

What is claimed is:

1. A method for operating a field-of-view display apparatus for use in a vehicle, the field of display apparatus having:

an image-generating unit of the field-of-view display apparatus, the image-generating unit being configured for generating a light beam with a desired display content;

a partially transparent reflection panel arranged and designed in the field of view of a user such that the light beam is reflected by the reflection panel to an eyebox of the user and the display content is presented to the user thereby in a virtual image plane behind the reflection panel, wherein the method comprises the steps of:

splitting the respective display content into a plurality of presentation subregions, which are presented side-by-side in the virtual image plane; and pre-distorting each of the plurality of presentation subregions during generation thereof in the image-generating unit with an associated individual digital warping matrix, which is predetermined or dynamically determined independently of the respective other presentation subregions, whereby the plurality of individual presentation subregions are presentable in the virtual image plane with differing perspective properties, wherein a first presentation subregion of the plurality of presentation subregions is defined by the first presentation subregion containing first objects which are intended to be presented in the virtual image plane with a first depth effect and/or a first contact-analog effect; and a first warping matrix associated with the first presentation subregion is configured to perspectively distort the first presentation subregion to achieve the first depth effect and/or the first contact-analog effect.

2. The method according to claim 1, wherein a second presentation subregion of the plurality of presentation subregions is defined by the second presentation subregion containing second objects which are intended to be presented in the virtual image plane with a second depth effect and/or a second contact-analog effect; and a second warping matrix associated with the second presentation subregion is configured to perspectively distort the second presentation subregions to achieve the second depth effect and/or the second contact-analog effect, wherein the second depth effect is different from the first depth effect and/or the second contact-analog effect is different from the first contact-analog effect.

3. The method according to claim 1, wherein a third presentation subregion of the plurality of presentation subregions is defined by the third presentation subregion containing third objects, and a third warping matrix associated with the third presentation subregion is configured to not distort the third presentation subregion or do so according to a predetermined image correction without any depth effect and/or contact-analog effect.

4. The method according to claim 3, wherein at least some of the third objects are intended to be presented in the virtual image plane without depth effect, and are text fields with system-related or vehicle-related information or other information without relation to real vicinity objects.

5. The method according to claim 1, wherein the splitting of the display content into the individual presentation subregions and/or the determination of the associated individual warping matrices is carried out dynamically depending on the respective display content to be presented.

6. The method according to claim 1, wherein the splitting of the display content into the individual presentation subregions and/or the determination of the associated individual warping matrices is static by being predefined in advance.

7. A control unit of a field-of-view display apparatus having an image-generating unit configured for generating a light beam with a desired display content; a partially transparent reflection panel arranged and designed in the field of view of a user such that the light beam is reflected by the reflection panel to an eyebox of the user and the display content is presented to the user thereby in a virtual image plane behind the reflection panel, wherein the control unit is operatively configured to:

split the respective display content into a plurality of presentation subregions, which are presented side-by-side in the virtual image plane, and pre-distort each of the plurality of presentation subregions during generation thereof in the image-generating unit with an associated individual digital warping matrix, which is predetermined or dynamically determined independently of the respective other presentation subregions, whereby the plurality of individual presentation subregions are presentable in the virtual image plane with differing perspective properties, wherein a first presentation subregion of the plurality of presentation subregions is defined by the first presentation subregion containing first objects which are intended to be presented in the virtual image plane with a first depth effect and/or a first contact-analog effect; and a first warping matrix associated with the first presentation subregion is configured to perspectively distort the first presentation subregion to achieve the first depth effect and/or the first contact-analog effect.

8. A field-of-view display apparatus for use in a vehicle, comprising:

the image-generating unit designed for generating a light beam with desired display content;

the control unit according to claim 7; and the partially transparent reflection panel arranged in the beam path of the light beam.

9. The field-of-view display apparatus according to claim 8, further comprising:

at least one mirror which is arranged in the beam path of the light beam generated by the image-generating unit and is configured such that the light beam is incident on the reflection panel in a predetermined form and direction so as to be reflected thereby to the eyebox of the user and to thereby present the display content to the user in the virtual image plane behind the reflection panel.

10. The field-of-view display apparatus according to claim 8, wherein the field-of-view display apparatus is configured to present the display content in a virtual image plane which is horizontally inclined with respect to a vehicle-side Cartesian coordinate system or is horizontal when installed in a vehicle.

11. A vehicle having mutually perpendicular longitudinal, lateral and height axes of a vehicle-side Cartesian coordinate system, comprising:

a windshield; and an instrument panel arranged below the windshield; and a field-of-view display apparatus according to claim 8 wherein the image-generating unit of the display apparatus is arranged inside the instrument panel or in or on the top side thereof, and the reflection panel is formed as a portion of the windshield or as a combiner panel arranged in front of the windshield inside the vehicle.

* * * * *